(12) United States Patent
Pasumansky et al.

(10) Patent No.: US 7,958,122 B2
(45) Date of Patent: Jun. 7, 2011

(54) DATA DOMAINS IN MULTIDIMENSIONAL DATABASES

(75) Inventors: Mosha Pasumansky, Redmond, WA (US); Alexander Berger, Sammamish, WA (US); Dmitry Berger, Redmond, WA (US); Irina Gorbach, Bellevue, WA (US); Marius Dumitru, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 564 days.

(21) Appl. No.: 12/042,707

(22) Filed: Mar. 5, 2008

(65) Prior Publication Data

US 2009/0228436 A1    Sep. 10, 2009

(51) Int. Cl.
  *G06F 7/00* (2006.01)
  *G06F 17/30* (2006.01)
(52) U.S. Cl. ........................................ 707/736
(58) Field of Classification Search ............... 707/736
  See application file for complete search history.

(56) References Cited

U.S. PATENT DOCUMENTS

| | | | |
|---|---|---|---|
| 5,761,652 A * | 6/1998 | Wu et al. ........................ | 1/1 |
| 5,870,746 A | 2/1999 | Knutson | |
| 6,453,313 B1 | 9/2002 | Klein | |
| 6,636,870 B2 | 10/2003 | Roccaforte | |
| 6,735,590 B1 * | 5/2004 | Shoup et al. ................. | 1/1 |
| 7,167,856 B2 | 1/2007 | Lawder | |
| 7,243,100 B2 | 7/2007 | Ma | |
| 2002/0188618 A1 | 12/2002 | Ma | |
| 2005/0004904 A1 | 1/2005 | Kearney | |
| 2005/0071349 A1 | 3/2005 | Jordan | |
| 2006/0161544 A1 | 7/2006 | Lee | |

OTHER PUBLICATIONS

Cabibbo, Luca and Torlone, Riccardo, "An Architecture for Data Warehousing Supporting Data Independence and Interoperability," International Journal of Cooperative Information Systems, World Scientific Publishing Co., 22 pp., http://www.dia.uniroma3.it/~torlone/pubs/ijcis01.pdf.

Johnson, Theodore and Shasha, Dennis, "Some Approaches to Index Design for Cube Forests," AT&T Labs-Research and New York University, 1999, 9 pp. sites.computer.org/debull/99dec/johnson1.ps.

Burdick, Doug, Doan, Anhai, Ramakrishnan, Raghu and Vaithyanathan, Shivakumar, "OLAP over Imprecise Data with Domain Constraints," University of Wisconsin—Madison, Yahoo! Research and IBM Almaden Research Center, 2007, 12 pp. http://pages.cs.wisc.edu/~anhai/papers/olap-vldb07.pdf.

Lo, Yu-Lung, Hua, Kien A., and Young, Honesty C., "GeMDA: A Multidimensional Data Partitioning Technique for Multiprocessor Database Systems," Distributed and Parallel Databases, 9, 211-236, 2001, Kluwer Academic Publishers, Manufactured in The Netherlands, 26 pp. http://wotan.liu.edu/docis/lib/goti/rclis/dbl/dipada/(2001)9%253A3%253C211%253AGAMDPT%253E/www.cs.ucf.edu%252Fdsg%252Fpublication%252F2001%252FGeMDA.pdf.

* cited by examiner

*Primary Examiner* — Greta L Robinson
*Assistant Examiner* — Jeffrey Chang
(74) *Attorney, Agent, or Firm* — Shook, Hardy Bacon LLP

(57) ABSTRACT

Systems and method for creating multidimensional data cubes containing data domains for analyzing large amounts of data are provided. Data domains may be included in the major object of a multidimensional data cube. Further embodiments of the present invention provide methods for querying multidimensional data cubes having data domains. Embodiments of the present invention provide for defining data domains by any object in the major object model and for defining parent and child data domains.

12 Claims, 5 Drawing Sheets

DATA DOMAINS IN MULTIDIMENSIONAL DATABASES

BACKGROUND

Online analytical processing (OLAP) is an important aspect of many data warehouse and business analysis systems. OLAP services provide for multidimensional access and navigation of data in an intuitive and natural way, providing a global view of data that can be drilled down into particular data of interest. Typical services provided by OLAP systems include analytical tools to rank, aggregate, and calculate indicators for the data under analysis. These tools are generally effective, but may become less efficient as the databases under analysis become larger and more complex.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to using data domains to define and organize multidimensional data for use with OLAP multidimensional data cubes. Data domains are defined during the creation of the data cubes and may be in the major object of a data cube model, although they can also apply on any level below the object. Data domains are used to define how data in a data cube is organized, sliced, aggregated, and cached and enable strategic and efficient querying of the multidimensional data represented therein.

Further embodiments of the present invention allow the use of data domains as references to other domains defined in a cube structure. In one embodiment, a data domain may be a sub-domain of a domain that it references, the parent domain. Data domains may be used to define separation of data from multidimensional data cubes, and may be used to define new granularity. Data domains may be included in any number of objects, such as databases, dimensions, cubes, measure groups, and partitions.

These and other aspects of the invention will become apparent to one of ordinary skill in the art upon a reading of the following description, drawings, and the claims.

BRIEF DESCRIPTION OF THE DRAWINGS

The present invention is described in detail below with reference to the attached drawing figures, wherein.

DETAILED DESCRIPTION

Figure 1:
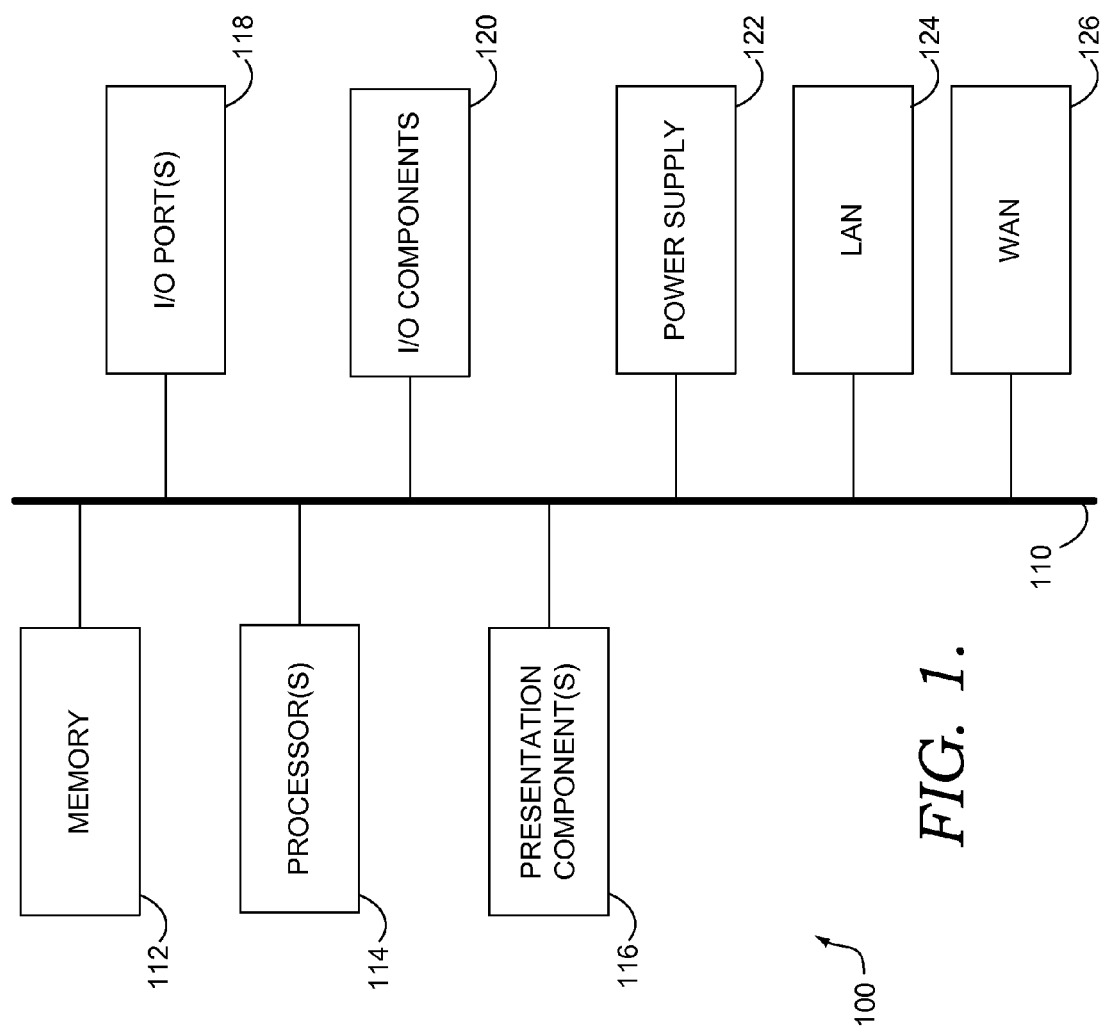
FIG. 1 is a block diagram of an exemplary computing environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention allow for using data domains to separate and organize multidimensional data for use in OLAP analysis. Data domains may enable strategic querying of the data and may be defined by database administrators, end users, or other relevant parties.

Embodiments of the present invention provide methods for generating an OLAP data cube using data domains, wherein data is first received from a data source. A user or administrator defines measures and measure groups for the data, and further defines dimensions comprising attributes that describe various aspects of the measures. Data domains are defined and used as parameters for structuring the data. The data is then structured according to the measures, dimensions, and domains and the resulting multidimensional data cube may be stored on a computing device.

Further embodiments of the present invention provide methods for querying a multidimensional data cube that contains data domains. In doing so, a user first selects one or more aggregation designs, wherein at least one parameter of the aggregation design is specified by a data domain contained in the cube structure. A user then may define one or more partitions that may be used to organize and store the aggregations, caches or other query designs as desired. Partitions may be specified by reference to various data domains as well. Instructions for querying the multidimensional data cube are created, and may include the aggregation designs and partition definitions. The query instructions are then used to query the multidimensional data cube, and the user is able to retrieve results that satisfy the query instructions. The results may then be displayed on a display device.

Still further embodiments of the present invention provide for one or more computer-storage media having computer-executable instructions embodied thereon for performing a method for querying multidimensional data cube having data domains. The method includes retrieving data from a data source, creating a multidimensional data cube to represent that data, and allowing users to query the data cube. The method may further include defining data domains that may comprise parameters for querying the data cube, receiving query instructions, applying them to the data cube and displaying query results on a display device.

Having briefly described an overview of the present invention, an exemplary operating environment in which various aspects of the present invention may be implemented is described below in order to provide a general context for various aspects hereof. Referring initially to FIG. 1, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks, or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media, as used herein, can be any available storage media that can be accessed by computing device 100 and includes both volatile and nonvolatile media, removable and non-removable media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

In some embodiments, computing device 100 operates in a networked environment using logical connections to one or more remote computers. A remote computer may be another personal computer, a server, a router, a network PC, a peer device, or other common network node. In embodiments of the present invention, a remote computer may be a server computer containing the computer-storage media which embodies the computer-executable instructions used to perform the methods described herein. In other embodiments, the remote computer may contain databases that house the information used in the analysis as described herein. A remote computer typically includes many or all of the components described above in connection with computing device 100. The logical connections depicted in FIG. 1 include a local-area network (LAN) 124 and a wide-area network (WAN) 126; typical embodiments would only include one or the other. Such networking environments are commonplace in offices, enterprise-wide computer networks, intranets and the Internet.

When placed in a LAN networking environment, computing device 100 connects to local network 124 through a network interface or adapter. When used in a WAN networking environment such as the Internet, computing device 100 typically includes a modem or other means for establishing communications over network 126. A modem may be internal or external to computing device 100 and connects to the system bus 110. Of course, the network connections shown are illustrative, and other means of establishing a communications link between the computers may be substituted.

As previously mentioned, in one embodiment, the present invention relates to using data domains to define and organize multidimensional data for use with OLAP multidimensional data cubes. Data domains are defined during creation of the data cubes and may enable strategic and efficient querying of the multidimensional data represented therein.

Figure 2:
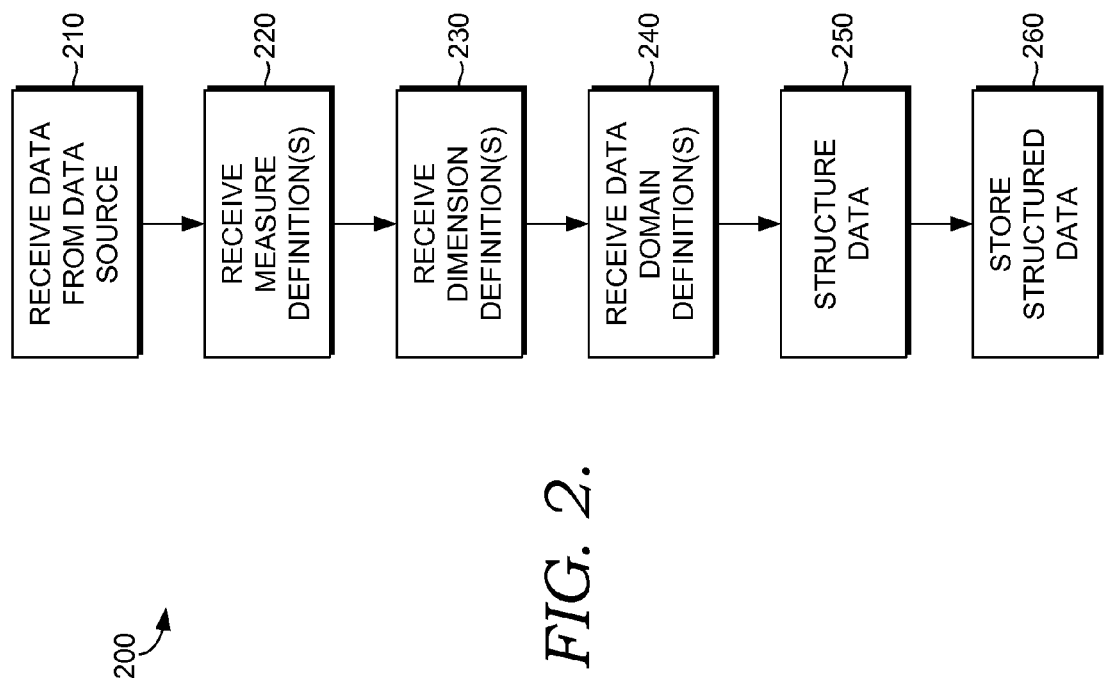
FIG. 2 is a flow diagram showing a method for creating a multidimensional data cube using data domains in accordance with an embodiment of the present invention.

Turning to FIG. 2, a flow diagram is illustrated which shows an exemplary method 200 for generating a multidimensional data cube. It will be readily appreciated by those skilled in the art that methods similar to the one illustrated in FIG. 2 may be practiced with any number of modifications and may not necessarily be performed in the same order as described in FIG. 2 and the following text. The methods described herein are intended to be exemplary in nature and are not intended to be limited to being necessarily performed in the order described herein.

Initially, as indicated at block 210, data is received from a data source. Generally, the data source is a database or multiple databases, such as a database cluster. In an embodiment of the present invention, the database is a relational database comprising both fact tables and dimension tables. The data source may include data related to any number of business activities, including, for example, sales or import/export activities. The data received form the data source may be aggregate data that indicates one or more properties or values associated with the various types of information in the data source. Furthermore, the data received from the data source may be linked to the facts contained within the data source so that users can obtain more detailed information associated with the results of queries on the aggregate data.

Figure 3:
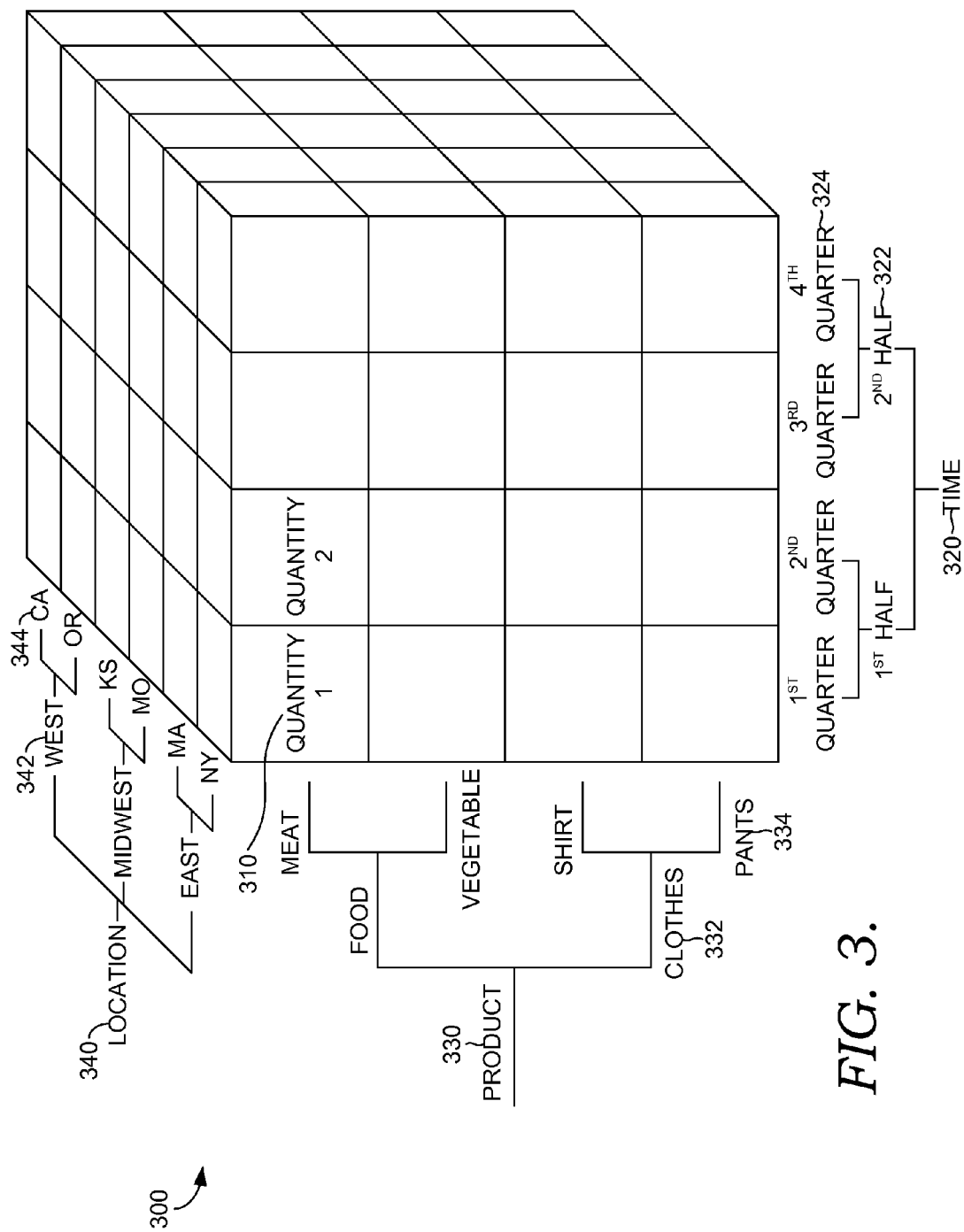
FIG. 3 is a schematic diagram illustrating an exemplary conceptual representation of a multidimensional data cube created in accordance with an embodiment of the present invention.

After receiving the data, measures are defined, as indicated at block 220. These definitions may be received from a user or generated by the system, both of which are intended to be encompassed in the phrase "receiving a definition." As shown in FIG. 3, which illustrates an exemplary conceptual representation of a multidimensional data cube 300, a measure 310 may be an indicator related to facts from the data source. Measures may represent columns that contain data, and are typically mapped to columns in fact tables from the data source. As will be appreciated by those skilled in the art, there are many ways by which measures may be defined, and nothing herein is intended to limit the applicability of any such definitions to these methods. For example, measures may be defined by quantifiable data, measure expressions (typically used for weighting data), attribute columns from dimension tables, or as calculated members based on other measures in the cube. For example, as shown in FIG. 3, a data cube related to sales data may contain a measure 310 for the quantity of products sold. Additionally, measures may be categorized into measure groups. Measure groups generally mirror the grouping of the associated columns in the underlying fact tables from the data source. Measure groups can enable the OLAP system to associate dimensions with measures and to optimize aggregation of measures that have distinct count as their aggregation behavior.

In a multidimensional data cube such as the exemplary data cube 300 illustrated in FIG. 3, each measure may be related to one or more dimensions 320, 330, and 340, which constitute criteria to be used when analyzing the data. For example, the quantity of products sold measure described above may have the following dimensions: Time 320, Product 330, and Retailer Location ("Location") 340. These dimensions may have a variety of attributes, which can be used as more specific criteria by which the measures can be analyzed. Attributes represent the various aspects of the dimension by which the measures can be aggregated. For example, in FIG. 3, the Time dimension 320 can be divided into halves of years (six months) 322 or quarters of years 324. The Product dimension 330 of FIG. 3 can be divided by two levels of attributes: the first level 332 indicates whether the Product 330 is a food product or clothing and the second level 334 indicates whether a food product is a meat or a vegetable, and whether a clothing product is a shirt or a pair of pants. Similarly, the Location dimension 340 of FIG. 3 can be separated by three broad regions 342 and each of those broad regions may be separated by particular states 344.

Figure 4:
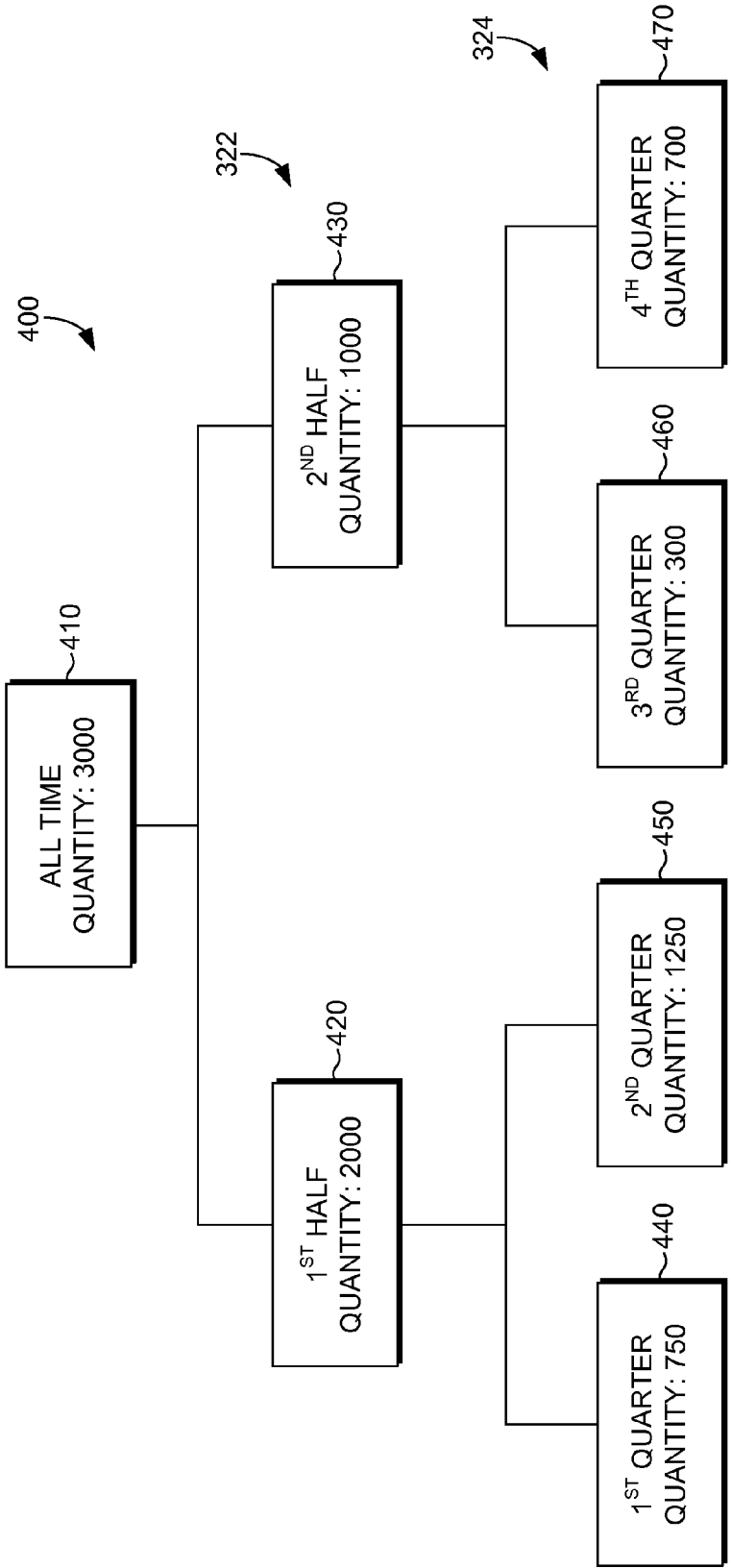
FIG. 4 is a schematic diagram illustrating an exemplary attribute level hierarchy for a multidimensional data cube dimension, in accordance with an embodiment of the present invention.

Next, as indicated at block 230 (FIG. 2), the dimensions are defined. As with the measures, these definitions may be received from a user or generated by the system. The phrase "receiving a definition" is intended to encompass both situations. Dimensions are groups of attributes that may be used to describe measures in a cube. As will be readily appreciated by those skilled in the art, the structure of dimensions is generally derived from the structure of the underlying dimension tables. Dimensions may describe measures directly, or they may be used as reference dimensions to describe other dimensions. Each dimension of a multidimensional data cube may contain one or more attributes, which are generally organized into multiple level hierarchies, an example of which is illustrated in FIG. 4. These hierarchies, which are typically defined by the user, provide drill-down paths for browsing the associated data at different levels of detail, or granularity. FIG. 4 is an illustration of an exemplary hierarchy 400 for the Time dimension 320. It contains a highest level (the "All level"), All Time 410; an upper leaf level 322, and a lower leaf level 324. Each level in a dimension contains one or more distinct values. These values are known as members. As illustrated in the exemplary diagram of FIG. 4, a database may include data for each half and each quarter in each year, in which case the half 322 and quarter 324 levels may have two and four members, respectively. For example, as shown in FIG. 4, the half level 322 contains a first half member 420 and a second half member 430. The quarter level 324 contains a first quarter member 440, a second quarter member 450, a third quarter member 460, and a fourth quarter member 470.

Returning to FIG. 2, data domains are defined for the data received from the data source, as indicated at block 240. The definitions of data domains may be either received from a user or generated by the system, both of which are intended to be encompassed by the phrase "receiving a definition." Data domains are indicators related to the data from the data source that assist in processing efficient queries of the data by defining, for example, how the data is organized, sliced, aggregated, and cached. Thus, the definitions of data domains are generally dictated by one or more comprehensive query strategies for a particular set of data. These strategies may be developed by the end user or by a database administrator who defines them to satisfy anticipated objectives of the end user. Furthermore, data domains may be redefined at any time to further the user's analysis objectives.

Data domains may be included in the major object of the object model, and can apply on any level below the object by which they are defined. A data domain may be defined as a particular aspect of a database, dimension, or measure group. For example, if the data source is a database containing information regarding online sales by members of an online sales organization, business managers may be interested in analyzing sales to certain individuals. If the database contains a table for recording the User ID of individuals who log in and make purchases, a data domain may be defined by "User ID" in the database. In that case, all partitions in all measure groups will be sliced in accordance with that definition. Additionally, data domains may be defined as particular aspects of the data cube itself, or as aspects of one or more partitions thereof. In embodiments of the present invention, data domains may be used to specify slices, which define attributes by which data may be divided when queried. Such attributes may also include ranges of attributes and drill-through attributes.

In further embodiments of the present invention, data domains may contain specifications for granularity, which defines what part of a measure group the particular data domain represents and how it relates to the rest of the data. Granularity refers to the level of detail represented by a particular measure. For example, a measure that contains individual User IDs for purchasers is said to have granularity on the individual purchaser level. A measure may not have any finer granularity than that of the fact table from which it is derived, but its granularity may be made coarser by associating dimensions that refer to data with less specific granularity. Data domains containing specifications for granularity of the data may be useful in querying the data by providing logical limits to results obtained in a query. For example, if a query requests data represented by a particular data domain that specifies a particular granularity of the data, the query will generate useful results. However, if that query specifies data for that data domain, but that is represented by a different granularity of the data, the query may generate an error message to the user.

In still further embodiments of the present invention, aggregation design may be specified by data domains. In this case, domains of data may have varying aggregation designs, providing support for various ways of aggregating data for different data granularity. Aggregations typically are pre-computed summaries of selected data that allow an OLAP system or a relational database to respond quickly to queries by avoiding collecting and aggregating detailed data during query execution. For example, a user might want to know sales data for a given period of time without regard to geographical distinctions. These types of queries are efficiently answered through the use of aggregations. Without aggregations, the system would need to use the detailed data to answer these queries, resulting in potentially substantial processing delays. With aggregations, the system computes and materializes aggregations ahead of time so that when the query is submitted to the system, the appropriate summary already exists and can be sent to the user much more quickly.

Generally, aggregations are defined by the level of detail aggregated in each dimension, and as mentioned above, may be specified in various ways for different data domains. The level of detail of a dimension is specified using the appropriate hierarchical level of the dimension, which may vary depending on the data domain or domains that are included within the aggregation. For example, one aggregation might be a product-year-state aggregation. In this example, the aggregation may be defined this way for a particular data domain, but may be defined as a product-month-state aggregation, for example, if performed within a different data domain. Aggregations such as this are created using aggregation functions. The most typical of these is the sum function, wherein measures are summed along each dimension specified. Those skilled in the art will appreciate that there are many other types of aggregation functions as well, including, for example, Count functions, Min functions, Max functions, and DistinctCount functions.

Generally, if an aggregation level is not specified for a dimension in an aggregation, the aggregation is considered detailed by the "ALL" level of that dimension, as represented in FIG. 4 by block 410. This may not be the case however, if the aggregation is further specified for a particular data domain. For example, generally a Time-Location aggregation is equivalent to an all products-time-location aggregation; however, if a Time-Location aggregation is specified for a data domain that is defined by a particular product type, Product A, in the database, a Time-Location aggregation will be equivalent to a Product A-time-location aggregation. In other embodiments, a data domain may be defined at the measure group level and a product-time-state aggregation may aggregate all of the data related to particular aspects of all products across the All Time and All State dimension attribute levels.

In various embodiments of the present invention, data domains may contain specification for defining partitions and caching data. Partitions are typically used to manage and store data and aggregations. Partitions are generally defined by measure groups, and a measure group may reflect the combined data in all of the partitions defined on that measure group. Partitions are used when querying a data cube and may be stored in separate sets of files. Partitions may be updated to reflect updates to the facts in the information source.

Caching data may further enable analysis by using existing aggregations that may be stored in partitions to generate new aggregations based on the existing aggregations. For example, an aggregation may contain information for sales aggregated over each month, but a user may wish to examine the nature of sales aggregated over each year. Caching allows an efficient retrieval of this information using the monthly aggregations to derive yearly aggregations, instead of going back to the most granular level of the data to perform the aggregations.

Data domains may enable more efficient and useful processing of updates to partitions. Generally, when data is updated, the existing aggregations and caches must be discarded and replaced with entirely new aggregations and caches. However, if the data is separated by data domains, it is possible to update the data without discarding all of the existing aggregations and caches. The data domains may be defined in such a way that enables the system to keep all of the aggregations and caches that are not affected by the updates, and only discard those existing aggregations and caches that are affected by the updates. In this way, the use of data domains improves the efficiency of updating partitions that contain aggregations and caches and reduces the necessity of repeated aggregation and caching procedures to keep the partitions updated.

Data domains may also be defined in reference to other previously defined data domains. In that case, the previously defined data domain may be called a parent domain, and the data domain defined in reference to the parent may be called the child data domain. If defined in this manner, all of the attributes will be applied first by the parent domain and then by the child domain. For example, a database domain may define data separation by "User ID" and not define new granularity. Within the measure group, another data domain can be defined by Weeks and all of the data of the partition thereof will be divided by weeks. If the database domain is specified as the parent and the "Weeks" domain is specified as its child, the system may then be able to divide the data by User ID and Weeks. In this way, data domains generally enable drill-through dimension data to be predefined and easily accessible by queries and may enable data to be loaded on different granularities based on the slices of data defined by the different data domains.

After the data domains are defined, the data is structured, as shown in block 250 of FIG. 2, according to the measures, dimensions, and data domains that have been defined as described above. The resulting data structure may be a multidimensional data cube. FIG. 3 illustrates an exemplary conceptual model of such a multidimensional data cube. The data cube 300 represented by the illustration in FIG. 3 contains, for simplicity, one measure, Quantity 310 and three dimensions, Time (when product was sold) 320, Product (type of product sold) 330, and Location (of sale) 340. As indicated by the illustration, each dimension comprises two leaf levels of attributes.

Finally, as indicated at block 260 of FIG. 2, the structured data, which is represented by the multidimensional data cube described above, is stored on a computing device, such as the computing device 100 described in relation to FIG. 1, and are now accessible to an end user who wishes to query the data.

Figure 5:
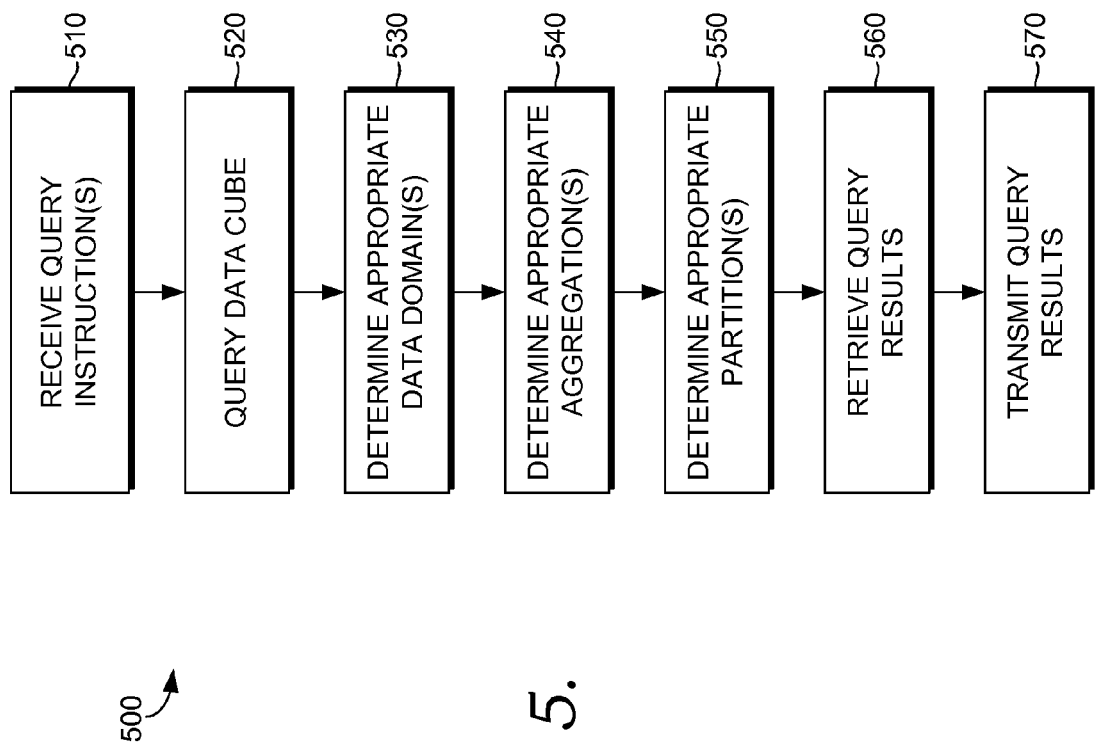
FIG. 5 is a flow diagram showing an exemplary method for querying a multidimensional data cube containing data domains in accordance with an embodiment of the present invention.

Turning now to FIG. 5, a flow diagram is illustrated which shows a method for processing a query directed to a multidimensional data cube using data domains, such as the one created using the exemplary process described above. At block 510, the method begins with receiving a query comprised of one or more query instructions created by the user. These query instructions direct the OLAP system to retrieve certain sets of data. In this case, the query instructions include both an identifier for the cube (e.g. a cube name) and a definition of the requested data. As will be readily appreciated by those skilled in the art, the query instructions may additionally include definitions for structuring caches or other types of data storage. At block 520, the query instructions are used to query the multidimensional data cube.

To process the query, the system first determines the appropriate data domains that contain the query results, as shown at block 530. Next, at block 540, the system determines appropriate aggregations to return responsive to the query. The aggregations may be defined, in part, according to the data domains, and are generally defined by an aggregation function that is calculated over a particular range of measures and dimensions.

At block 550, the system determines the appropriate partitions containing data that is responsive to the query instructions. The partitions may be used for storing sets of aggregations. As discussed above, a partition may be structured to store one or more aggregations and may be structured to allow for incremental updates to the aggregations stored therein as the underlying data is aggregated. The partition may be further defined according to data domains, which may or may not be specified in a particular aggregation design. This enables the system administrator to design partitions that contain similar aggregations over different data domains. These aggregations may be combined or stored separately within the partition structure. The partition structure may further limit the aggregation designs by allowing aggregations only over data domains specified in the partition structure.

Results that satisfy the query instructions are retrieved, as indicated at block 560. Finally, the results of the query, which may include aggregations, partitions containing aggregations, caches, other types of data storage or any combination thereof, are transmitted to a computing device, as indicated at block 570. It will be readily appreciated in the art that the results may also be displayed or stored on a local or remote computing system and that the format of the displayed data may take any form known in the art, including various types of tables, charts and graphs.

As can be understood, embodiments of the present invention provide for application of data domains to any type of multidimensional data cube as provided by any of the various available analysis services, including, for example, Microsoft SQL Server Analysis Services (SSAS). Further embodiments of the present invention provide applying the methods and techniques described above to other forms of analysis services designed to work with relational databases and other structures used to represent multidimensional data. Still further embodiments of the present invention may be implemented using client and server computing machines or may be implemented on a single machine or a closed network of machines.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer-readable media having computer-executable instructions embodied thereon for performing a method for generating a multidimensional data cube, the method comprising:
   receiving data from a data source;
   receiving a definition of at least one measure for indicating one or more facts in the data source;
   receiving a definition of at least one dimension, wherein the at least one dimension includes one or more attributes;
   receiving a definition of at least one data domain, wherein the at least one data domain comprises at least one parameter for structuring the data;
   structuring the data according to the at least one measure, the at least one dimension, and the at least one data domain, wherein the structured data is a multidimensional data cube such that a particular measure of the at least one measure imparts knowledge of the at least one dimension and the one or more attributes that pertain to that particular measure; and
   storing the structured data on a computing device.

2. The one or more computer-readable media of claim 1, wherein receiving a definition of at least one data domain further comprises receiving a new definition of the at least one data domain after structuring the data.

3. The one or more computer-readable media of claim 1, wherein receiving a definition of at least one data domain comprises receiving a definition of the at least one data domain by at least one of a measure, a measure group, and a dimension.

4. The one or more computer-readable media of claim 1, wherein receiving a definition of at least one data domain comprises receiving a definition of the at least one data domain by at least one of a database, a data cube and a partition.

5. The one or more computer-readable media of claim 3, further comprising receiving a definition of at least one parent data domain and at least one child data domain, wherein the at least one child data domain is a sub-domain of the at least one parent domain.

6. The one or more computer-readable media of claim 4, further comprising receiving a definition of at least one parent data domain and at least one child data domain, wherein the at least one child data domain is a sub-domain of the at least one parent data domain.

7. The one or more computer-readable media of claim 1, wherein receiving a definition of at least one data domain comprises receiving a definition of the at least one data domain by at least one partition, further wherein the at least one partition is revised.

8. One or more computer-readable media having computer-executable instructions embodied thereon for performing a method for analyzing multidimensional data using data domains, the method comprising:
   receiving multidimensional data from at least one data source;
   receiving a definition of at least one data domain, wherein the at least one data domain comprises at least one variable parameter for organizing the multidimensional data;
   creating at least one multidimensional data cube to represent the multidimensional data such that a particular item of data in the multidimensional data associated with a particular parameter of the at least one variable parameter imparts knowledge of another parameter of the at least one variable parameter that pertains to that particular item of data, wherein the at least one multidimensional data cube comprises the at least one data domain;
   receiving at least one query instruction;

applying the at least one query instruction to the multidimensional data cube to retrieve at least one query result that satisfies the at least one query instruction; and
displaying the at least one query result.

9. The one or more computer-readable media of claim 8, wherein the at least one query result comprises at least one of an aggregation, a partition, and a cache.

10. The one or more computer-readable media of claim 9, wherein the at least one of an aggregation, a partition, and a cache comprises at least one data domain.

11. The one or more computer-readable media of claim 8, wherein the at least one query result comprises at least one partition, further wherein the at least one partition is updated.

12. The one or more computer-readable media of claim 11, wherein the at least one partition comprises at least one data domain.

* * * * *